US012646983B2

(12) United States Patent
Shibayama et al.

(10) Patent No.: US 12,646,983 B2
(45) Date of Patent: Jun. 2, 2026

(54) ROTOR AND MOTOR

(71) Applicant: KAWASAKI JUKOGYO KABUSHIKI KAISHA, Kobe (JP)

(72) Inventors: Yoshiyasu Shibayama, Kobe (JP); Keigo Imamura, Kobe (JP); Kazuki Ueta, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 110 days.

(21) Appl. No.: 18/291,923

(22) PCT Filed: Jul. 30, 2021

(86) PCT No.: PCT/JP2021/028380
§ 371 (c)(1),
(2) Date: Jan. 25, 2024

(87) PCT Pub. No.: WO2023/007708
PCT Pub. Date: Feb. 2, 2023

(65) Prior Publication Data
US 2025/0030286 A1 Jan. 23, 2025

(51) Int. Cl.
*H02K 1/27* (2022.01)
*H02K 1/276* (2022.01)

(52) U.S. Cl.
CPC .................................... *H02K 1/276* (2013.01)

(58) Field of Classification Search
CPC ........ H02K 1/276; H02K 1/27; H02K 1/2766; Y02T 10/64
See application file for complete search history.

(56) References Cited

U.S. PATENT DOCUMENTS

| | | | |
|---|---|---|---|
| 4,110,646 A | 8/1978 | Rao | |
| 2006/0170301 A1* | 8/2006 | Masuzawa | H02K 1/276 |
| | | | 310/156.53 |
| 2013/0313936 A1* | 11/2013 | Shibata | H02K 1/2746 |
| | | | 310/156.43 |
| 2017/0187255 A1* | 6/2017 | Kanda | H02K 1/2766 |
| 2018/0062461 A1* | 3/2018 | Gieras | H02K 15/03 |

FOREIGN PATENT DOCUMENTS

| | | |
|---|---|---|
| CN | 102273050 A | 12/2011 |
| JP | S53-059810 A | 5/1978 |
| JP | 2003134707 A | 5/2003 |
| JP | 2012-178922 A | 9/2012 |

(Continued)

*Primary Examiner* — Thomas Truong
(74) *Attorney, Agent, or Firm* — XSENSUS LLP

(57) ABSTRACT

To reduce a leakage flux of a permanent magnet and suppress a decrease in magnet torque. A rotor includes a rotor body rotatable about a rotation axis and permanent magnets arranged in a circumferential direction centered on the rotation axis in the rotor body and having different magnetic poles alternately in the circumferential direction. The sectional shape of the permanent magnet perpendicular to the rotation axis is a shape extending along a predetermined reference line. The permanent magnet is magnetized in a direction crossing the reference line in a section perpendicular to the rotation axis. At least one end portion of the permanent magnet in the direction of the reference line is exposed through the outer peripheral surface of the rotor body.

6 Claims, 4 Drawing Sheets

(56)　　　　　　References Cited

FOREIGN PATENT DOCUMENTS

| JP | 2015-082860 A | 4/2015 |
| JP | 2016-096665 A | 5/2016 |
| JP | 2017118796 A | 6/2017 |
| JP | 2020156295 A | 9/2020 |
| JP | 2020-191710 A | 11/2020 |

* cited by examiner

ROTOR AND MOTOR

CROSS-REFERENCE TO RELATED APPLICATION

This application is based on PCT filing PCT/JP2021/028380, filed Jul. 30, 2021, the entire contents of which are incorporated herein by reference.

FIELD

The technique disclosed herein relates to a rotor and a motor.

BACKGROUND

Patent Document 1 discloses a motor. The motor includes a rotor and a stator. The rotor is of an embedded magnet type, and includes a rotor core and permanent magnets disposed in the rotor core.

CITATION LIST

Patent Document

Patent Document 1: Japanese Unexamined Patent Application Publication No. 2020-191710

SUMMARY OF THE INVENTION

In the rotor disclosed in Patent Document 1, there is a probability that a leakage flux (magnetic flux short-circuit) which is a magnetic flux generated from the permanent magnet and returning to the permanent magnet without linked with a stator coil is caused and magnet torque generated by the permanent magnet decreases accordingly.

The technique disclosed herein has been made in view of such a point, and an object thereof is to reduce a leakage flux of a permanent magnet and suppress a decrease in magnet torque.

The technique disclosed herein relates to a rotor including a rotor body rotatable about a rotation axis and permanent magnets arranged in a circumferential direction centered on the rotation axis in the rotor body and having different magnetic poles alternately in the circumferential direction. The sectional shape of each permanent magnet perpendicular to the rotation axis is a shape extending along a predetermined reference line, each permanent magnet is magnetized in a direction crossing the reference line in a section perpendicular to the rotation axis, and at least one end portion of each permanent magnet in the direction of the reference line is exposed through the outer peripheral surface of the rotor body.

DESCRIPTION OF EMBODIMENTS

Figure 1:
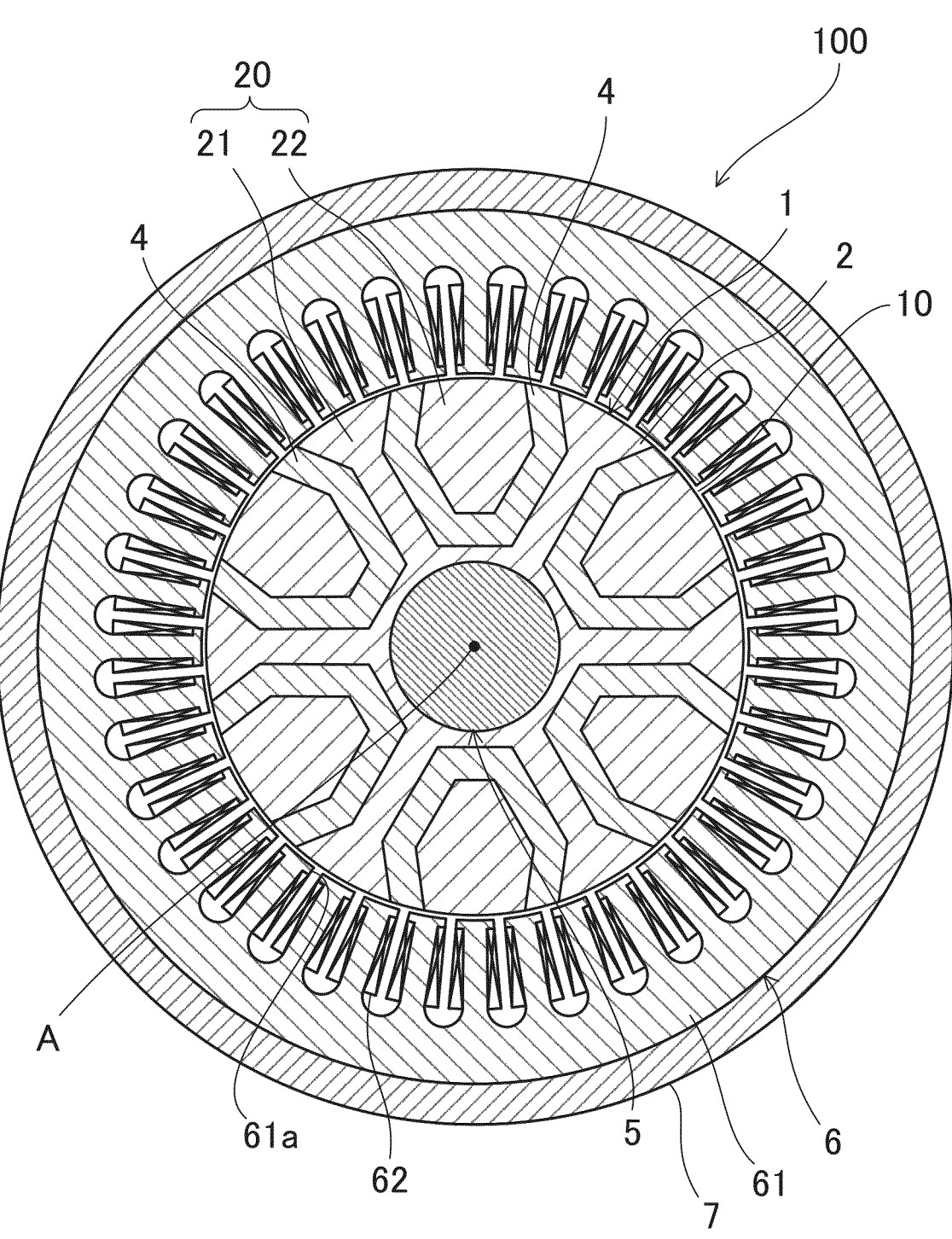
FIG. 1 is a sectional view of a motor.

Hereinafter, an exemplary embodiment will be described in detail with reference to the drawings. FIG. 1 shows a motor 100 according to the embodiment.

The motor 100 includes a rotor 1 that rotates about a predetermined rotation axis A and a stator 6 that rotates the rotor 1 about the rotation axis A. Permanent magnets 4 are embedded in the rotor 1. That is, the motor 100 is an interior permanent magnet (IPM) motor. The motor 100 may further include a motor case 7. The motor case 7 houses the rotor 1 and the stator 6. The stator 6 is fixed to the motor case 7. The rotor 1 is rotatably supported by the motor case 7.

Hereinafter, a direction in which the rotation axis A extends will be referred to as a "rotation axis direction." A circumferential direction centered on the rotation axis A will be referred to as a "circumferential direction." A radial direction centered on the rotation axis A will be referred to as a "radial direction." A side closer to the rotation axis A in the radial direction will be referred to as a "radial inside." and a side opposite to the rotation axis A will be referred to as a "radial outside."

The stator 6 includes a stator core 61 and a winding 62. The stator core 61 is a soft magnetic material. The stator core 61 includes, for example, electromagnetic steel sheets stacked on each other.

The stator core 61 is in an annular shape. Specifically, the stator core 61 is in a cylindrical shape. The stator core 61 is fixed to the motor case 7. The stator core 61 includes teeth 61a protruding inward of the stator core 61. The teeth 61a are aligned at intervals in the circumferential direction at the stator core 61. The winding 62 is wound around the teeth 61a. The stator 6 generates a rotating magnetic field for rotating the rotor 1 in such a manner that the winding 62 is supplied with current.

The rotor 1 includes a rotor body 2 that rotates about the rotation axis A and the permanent magnets 4 arranged in the circumferential direction in the rotor body 2 and having different magnetic poles alternately in the circumferential direction.

At least part of the rotor body 2 is made of a soft magnetic material. The rotor body 2 has magnetic saliency, and generates reluctance torque in the rotating magnetic field generated by the stator 6. The rotor body 2 includes a rotor core 20 and a shaft 5.

The rotor core 20 is a soft magnetic material. The rotor core 20 includes, for example, electromagnetic steel sheets stacked on each other. The rotor core 20 is in an annular shape surrounding the rotation axis A. Specifically, the rotor core 20 is in a cylindrical shape concentric with the stator core 61. The outer peripheral surface of the rotor core 20 defines the outer peripheral surface 28 of the rotor body 2. The shape of the section of the rotor core 20 perpendicular to the rotation axis A is the same across the entire length of the rotor core 20 in the rotation axis direction. There is an air gap 10 between the outer peripheral surface of the rotor core 20 and the inner peripheral surface of the stator core 61.

The shaft 5 is fitted in the rotor core 20. The shaft 5 is fixed to the rotor core 20. The center of the shaft 5 is coincident with the rotation axis A. The shaft 5 is rotatably supported by the motor case 7 through, e.g., a bearing. The rotor core 20 rotates about the rotation axis A together with the shaft 5. The shaft 5 is a soft magnetic material.

The permanent magnets 4 are disposed in the rotor core 20. The permanent magnets 4 generate magnet torque in the rotating magnetic field generated by the stator 6. The rotor 1 includes six permanent magnets 4. The permanent magnets 4 are located at equal intervals in the circumferential direction.

The permanent magnet 4 is a bonded magnet. The bonded magnet is a permanent magnet made of a magnet material containing magnet powder and a binder for binding the magnet powder. The magnet powder is powder of, e.g., a neodymium magnet, a samarium-iron-nitrogen-based magnet, a samarium-cobalt-based magnet, a ferrite magnet, or an alnico magnet or a mixture of two or more of these types of powder. The binder is, for example, thermosetting resin such as epoxy resin, thermoplastic resin such as polyamide resin, or rubber.

The permanent magnets 4 are obtained, for example, by insert molding. In this case, the permanent magnets 4 are obtained in such a manner that the magnet material to be the bonded magnets is injected into a mold 8 (see FIGS. 4 and 5) housing the rotor core 20. That is, the permanent magnets 4 are cured products of the magnet material charged into the rotor core 20.

Figure 2:
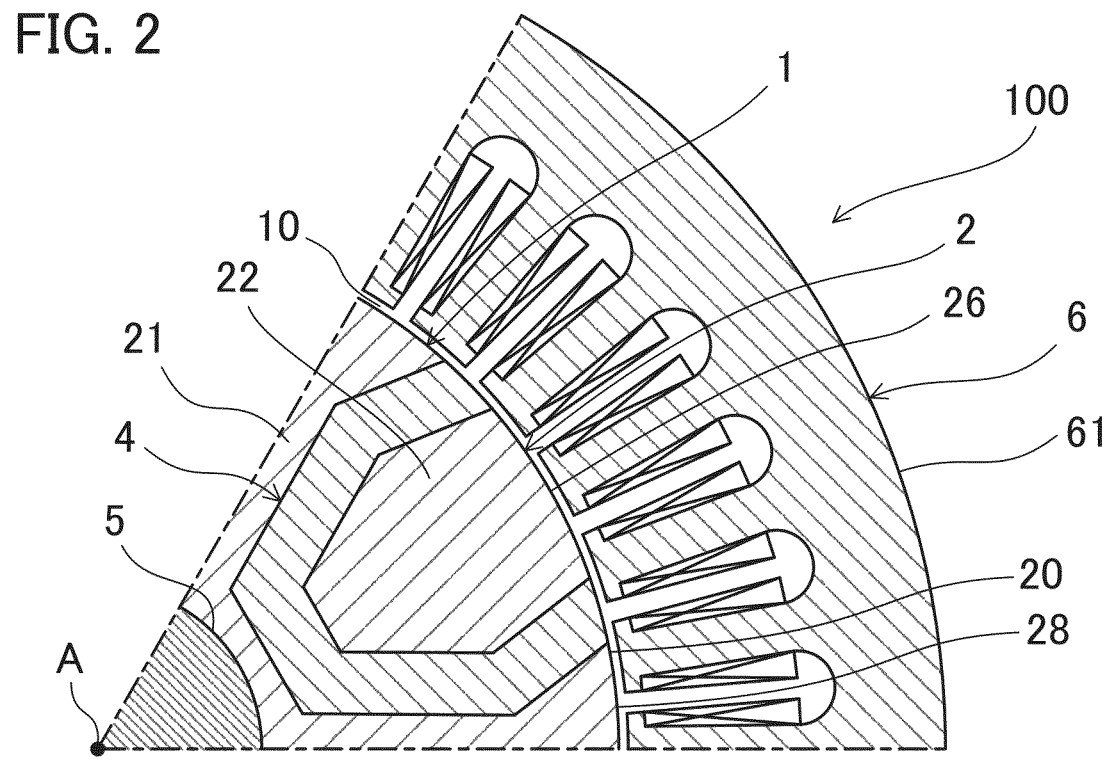
FIG. 2 is an enlarged sectional view of the motor.
Figure 3:
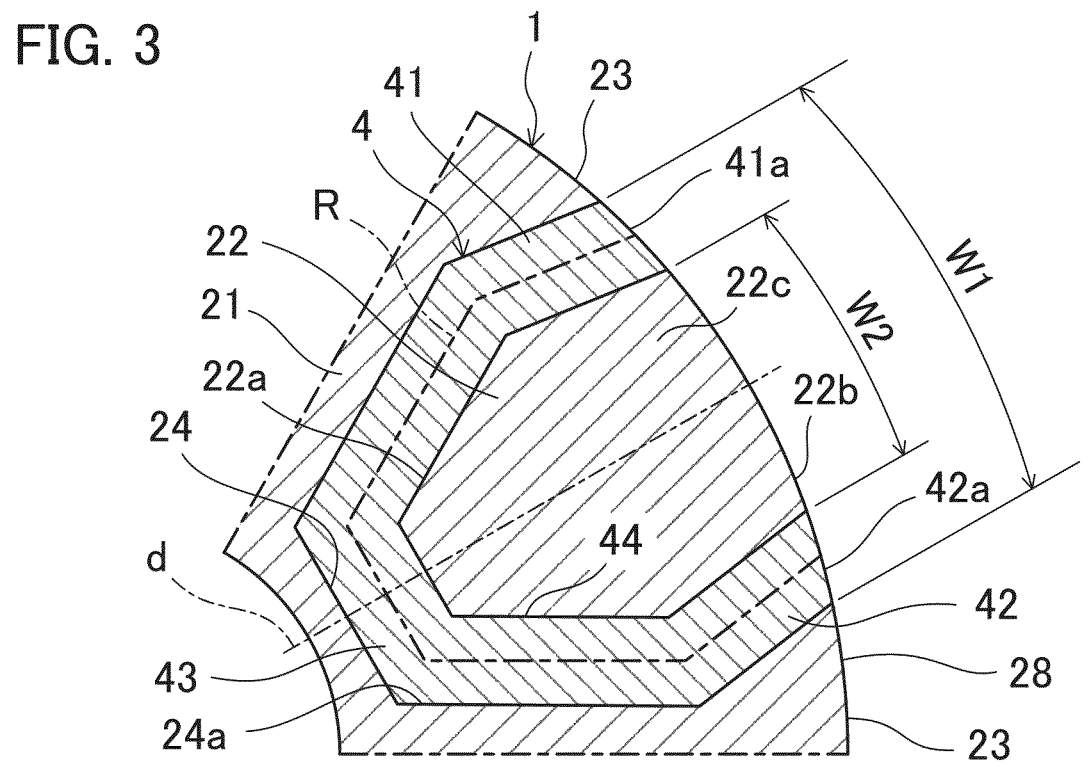
FIG. 3 is an enlarged sectional view of a rotor.

FIG. 2 is an enlarged sectional view of the motor 100. FIG. 3 is an enlarged sectional view of the rotor 1. The permanent magnet 4 is in a plate shape extending along the rotation axis A. The permanent magnet 4 is disposed across the entire length of the rotor core 20 in the rotation axis direction.

Hereinafter, the sectional shape of the rotor 1 perpendicular to the rotation axis A will be described. Unless otherwise specified, the "sectional shape" means a sectional shape perpendicular to the rotation axis A. The shape of the section of the permanent magnet 4 perpendicular to the rotation axis A is the same across the entire length of the permanent magnet 4 in the rotation axis direction.

The sectional shape of the permanent magnet 4 is a linear shape. That is, the sectional shape of the permanent magnet 4 is a shape extending along a predetermined reference line R. The permanent magnet 4 has, in a direction in which the reference line R extends, two end portions 41, 42 and a middle portion 43 positioned between the two end portions 41, 42. Note that the middle portion 43 does not indicate the entirety of a portion of the permanent magnet 4 other than the two end portions 41, 42 and indicates at least part of the portion other than the two end portions 41, 42. The middle portion 43 may or may not include the center of the permanent magnet 4 in the direction in which the reference line R extends.

The sectional shape of the permanent magnet 4 is a shape curved or bent so as to be recessed to the radial inside. That is, the permanent magnet 4 is curved or bent such that the two end portions 41, 42 of the permanent magnet 4 are closer to the outer peripheral surface 28 of the rotor body 2 (i.e., the outer peripheral surface of the rotor core 20) than the middle portion 43 of the permanent magnet 4 is close to the outer peripheral surface 28. Specifically, the sectional shape of the permanent magnet 4 is a U-shape recessed to the radial inside. More specifically, the sectional shape of the permanent magnet 4 is a line-symmetric shape with respect to a symmetrical axis extending in the radial direction.

The dimension (such a dimension will also be hereinafter referred to as a thickness) of the permanent magnet 4 in a direction parallel with a plane perpendicular to the rotation axis A and perpendicular to the reference line R is substantially constant. At least one of the two end portions 41, 42 of the permanent magnet 4 is exposed through the outer peripheral surface 28 of the rotor body 2. In this example, both the two end portions 41, 42 of the permanent magnet 4 are exposed through the outer peripheral surface 28 of the rotor body 2. The radial outside surfaces of the two end portions 41, 42 of the permanent magnet 4 are flush with the outer peripheral surface 28 of the rotor body 2.

The permanent magnet 4 is magnetized in a direction crossing the reference line R in the section perpendicular to the rotation axis A. Specifically, a direction of magnetizing the permanent magnet 4 is perpendicular to the reference line R. The symmetrical axis as the center of the line-symmetric shape of the permanent magnet 4 is, for example, set as a d-axis of the rotor 1.

The rotor body 2 includes a first portion 21 and second portions 22 divided by the permanent magnets 4. The rotor body 2 includes the same number of second portions 22 as that of the permanent magnets 4.

The first portion 21 is a portion of the rotor body 2 including the rotation axis A. The first portion 21 also includes the shaft 5. The outer peripheral surface of the first portion 21 includes curved surfaces 23 coincident with the outer peripheral surface of a single virtual circular column centered on the rotation axis A and recesses 24 recessed to the radial inside. The curved surfaces 23 and the recesses 24 are located alternately in the circumferential direction. That is, one curved surface 23 is located between adjacent two of the recesses 24. In other words, one recess 24 is located between adjacent two of the curved surfaces 23.

The curved surfaces 23 are arranged at equal intervals in the circumferential direction. The curved surfaces 23 are located on the outer peripheral surface of the single virtual circular column centered on the rotation axis A. The number of curved surfaces 23 is the same as the number of permanent magnets 4. The recesses 24 are arranged at equal intervals in the circumferential direction. Each recess 24 extends in the rotation axis direction, and opens to the radial outside. The number of recesses 24 is the same as the number of permanent magnets 4.

The permanent magnet 4 is housed in the recess 24. The sectional shape of the permanent magnet 4 is the shape curved or bent so as to be recessed to the radial inside as described above. That is, the permanent magnet 4 is in a shape fittable in the recess 24. The permanent magnet 4 closely contacts the inner surface 24a of the recess 24.

The permanent magnet 4 has a recess 44 extending in the rotation axis direction and opening to the radial outside. The second portion 22 is housed in the recess 44. The second portion 22 is positioned on the radial outside with respect to the middle portion 43 of the permanent magnet 4. The second portion 22 is in a shape fittable in the recess 44. The second portion 22 has an inner surface 22a positioned in the recess 44 and an outer surface 22b exposed to the radial outside through the recess 44. The inner surface 22a closely contacts the permanent magnet 4. The outer surface 22b defines, together with the curved surfaces 23 of the first portion 21, the outer peripheral surface of the single virtual circular column centered on the rotation axis A. The outer peripheral surface 28 of the rotor body 2 is defined by the curved surfaces 23 and the outer surfaces 22b.

The permanent magnet 4 is interposed between the first portion 21 and the second portion 22. The second portion 22 is separated from the first portion 21, and is not coupled to the first portion 21. The inner surface 24a of the recess 24 of the first portion 21 and the permanent magnet 4 is bonded to each other. The inner surface 22a of the second portion 22 and the permanent magnet 4 are bonded to each other.

Accordingly, the first portion 21, the second portions 22, and the permanent magnets 4 are integrally fixed to each other.

The end portions 41, 42 of the permanent magnet 4 are exposed to the radial outside between the first portion 21 and the second portion 22. Specifically, the end portion 41 has an end surface 41a positioned at one end in the direction of the reference line R. The end portion 42 has an end surface 42a positioned at the other end in the direction of the reference line R. The end surface 41a and the end surface 42a are smoothly connected to the curved surfaces 23 of the first portion 21 and the outer surface 22b of the second portion 22 to define a single curved surface. Specifically, the curved surfaces 23, the outer surfaces 22b, the end surfaces 41a, and the end surfaces 42a define the outer peripheral surface of the single virtual circular column centered on the rotation axis A.

The sectional shape of each of the two end portions 41, 42 of the permanent magnet 4 is a linear shape. In the section perpendicular to the rotation axis A, each of the two end portions 41, 42 is inclined with respect to the radial direction. A width W1 between the two end portions 41, 42 in the circumferential direction (i.e., a width in the circumferential direction from one end portion 41 to the other end portion 42) decreases toward the outer peripheral surface 28 of the rotor body 2 (i.e., with a distance from the rotation axis A). Since the permanent magnet 4 closely contacts the inner surface 24a of the recess 24, the size of the recess 24 (i.e., inner surface 24a) in the circumferential direction also decreases toward the outer peripheral surface 28 of the rotor body 2. Moreover, since the thickness of the end portion 41, 42 is constant, the size of the recess 44 of the permanent magnet 4 in the circumferential direction, i.e., a size inside the two end portions 41, 42 in the circumferential direction, also decreases toward the outer peripheral surface 28 of the rotor body 2. Since the second portion 22 closely contacts the recess 44, the width of a portion 22c of the second portion 22 sandwiched by the two end portions 41, 42 in the circumferential direction also decreases toward the outer peripheral surface 28 of the rotor body 2.

Figure 4:
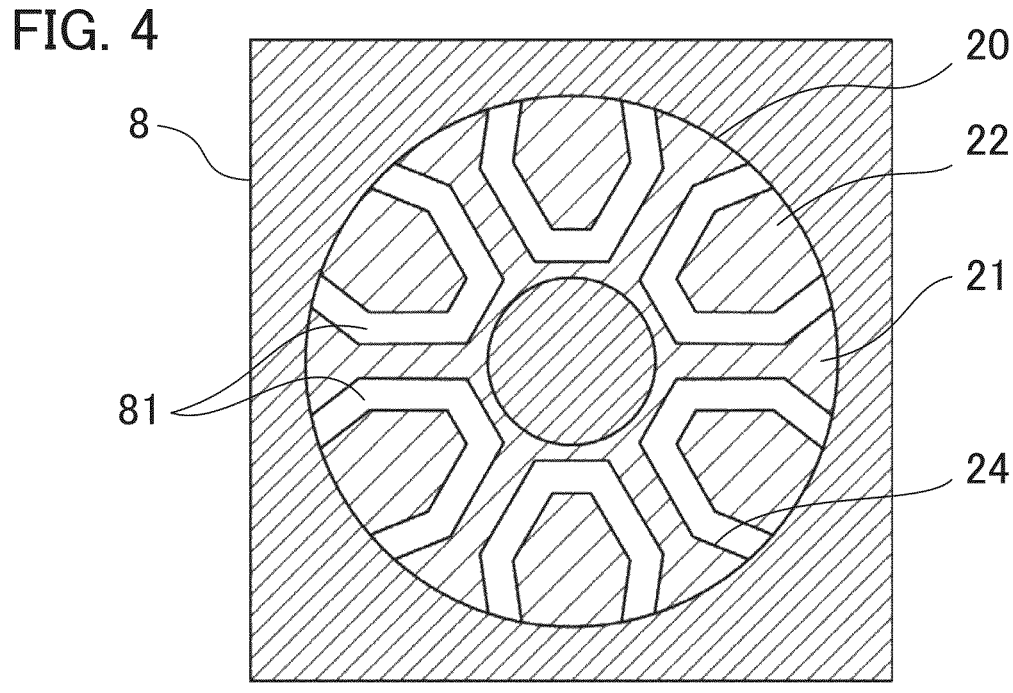
FIG. 4 is a sectional view showing a state in which a rotor core is loaded into a mold.
Figure 5:
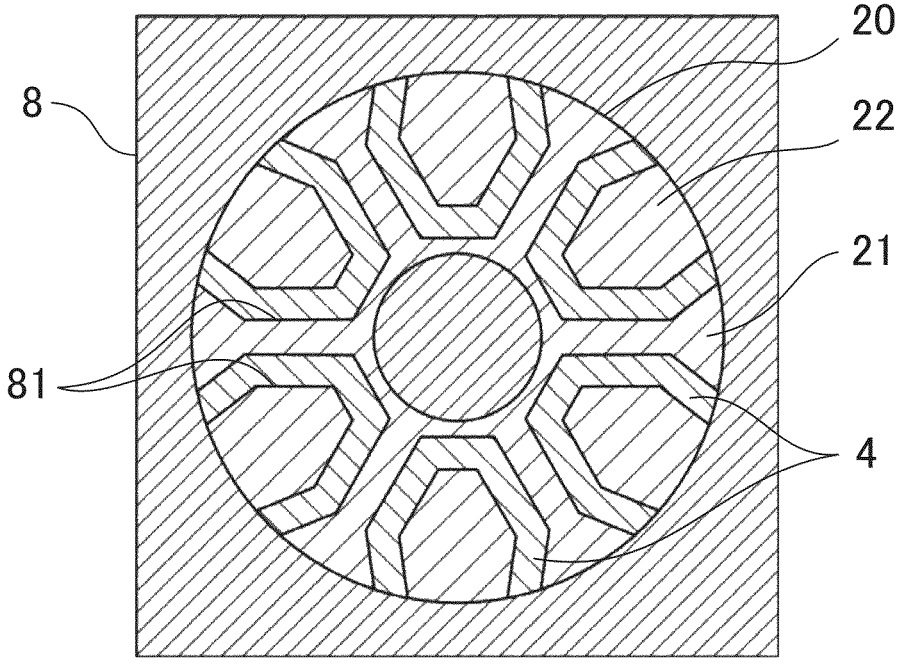
FIG. 5 is a sectional view showing a state in which the mold is filled with a material to be permanent magnets.

FIG. 4 is a sectional view showing a state in which the rotor core 20 is loaded into the mold 8. FIG. 5 is a sectional view showing a state in which the mold 8 is filled with the magnet material to be the permanent magnets 4. The permanent magnets 4 are molded using the mold 8 as shown in FIGS. 4 and 5, for example. First, as shown in FIG. 4, the second portions 22 and first portion 21 of the rotor core 20 are loaded into the mold 8. At this time, the second portions 22 are located in the recesses 24 of the first portion 21 with cavities 81 for molding the permanent magnets 4 between the first portion 21 and the second portions 22. Subsequently, as shown in FIG. 5, the magnet material to be the permanent magnets 4 is injected into the cavities 81 in the mold 8, and in this manner, the permanent magnets 4 are molded integrally with the rotor core 20.

When the rotating magnetic field is generated in such a manner that the winding 62 of the stator 6 is supplied with current, the magnet torque is generated by the permanent magnets 4, and the reluctance torque is generated by the rotor core 20. The rotor 1 rotates about the rotation axis A by the magnet torque and the reluctance torque.

As described above, since the end portions 41, 42 of the permanent magnet 4 are exposed through the outer peripheral surface 28 of the rotor body 2, a leakage flux (magnetic flux short-circuit), which is a magnetic flux generated from the permanent magnet 4 and returning to the permanent magnet 4 without linked with the winding 62 of the stator 6, is reduced. Specifically, preferably in terms of the magnet torque, more magnetic fluxes come out of the permanent magnet 4 to the outside of the outer peripheral surface 28 of the rotor body 2, and more magnetic fluxes enter the permanent magnet 4 from the outside of the outer peripheral surface 28. However, in a case where the end portions 41, 42 of the permanent magnet 4 magnetized in the direction crossing the reference line R are fully surrounded by the rotor body 2, some of the magnetic fluxes generated from the permanent magnet 4 may flow around outer portions of the end portions 41, 42 in the rotor body 2, and promptly return to the permanent magnet 4. Due to such leakage fluxes, the magnetic fluxes contributing to the magnet torque are reduced. On the other hand, in this example, the end portions 41, 42 of the permanent magnet 4 are exposed through the outer peripheral surface 28 of the rotor body 2. The rotor body 2 having a higher magnetic permeability than that of the permanent magnet 4 is not present on the radial outside of the exposed end portions 41, 42. Thus, the magnetic fluxes promptly returning to the permanent magnet 4 after having flowed around the outside of the end portions 41, 42, i.e., the leakage fluxes, are reduced. As a result, the amount of magnetic fluxes passing through the d-axis of the permanent magnet 4 increases, and the magnet torque is improved accordingly. Particularly in this example, since both the two end portions 41, 42 of the permanent magnet 4 are exposed through the outer peripheral surface 28 of the rotor body 2, the leakage fluxes around both the end portions 41, 42 are reduced. As a result, the magnet torque is more improved.

In a case where the two end portions 41, 42 of the permanent magnet 4 curved or bent to the radial inside are exposed through the outer peripheral surface 28 of the rotor body 2, the rotor body 2 is divided into the first portion 21 and the second portions 22 by the permanent magnets 4. Thus, there is a probability that the second portion 22 is detached and separated from the permanent magnet 4 in response to centrifugal force received at the time of rotation of the rotor 1. Moreover, there is a probability that when receiving the centrifugal force at the time of rotation of the rotor 1, the permanent magnet 4 is detached and separated from the first portion 21. However, in this example, the width W1 in the circumferential direction from one end portion 41 to the other end portion 42 of the two end portions 41, 42 of the permanent magnet 4 decreases toward the outer peripheral surface 28 of the rotor body 2. Thus, when receiving the centrifugal force at the time of rotation of the rotor 1, the permanent magnet 4 is supported by the rotor body 2 (specifically, portions of the inner surface 24a of the recess 24 contacting the two end portions 41, 42) from the radial outside. Thus, detachment of the permanent magnet 4 from the first portion 21 of the rotor body 2 is reduced.

Moreover, the width W2 of the portion 22c of the second portion 22 of the rotor body 2 sandwiched by the two end portions 41, 42 of the permanent magnet 4 in the circumferential direction decreases toward the outer peripheral surface 28 of the rotor body 2. When receiving the centrifugal force at the time of rotation of the rotor 1, the second portion 22 is supported by the two end portions 41, 42 of the permanent magnet 4 from the radial outside. Thus, detachment of the second portion 22 from the permanent magnet 4 is reduced.

Figure 6:
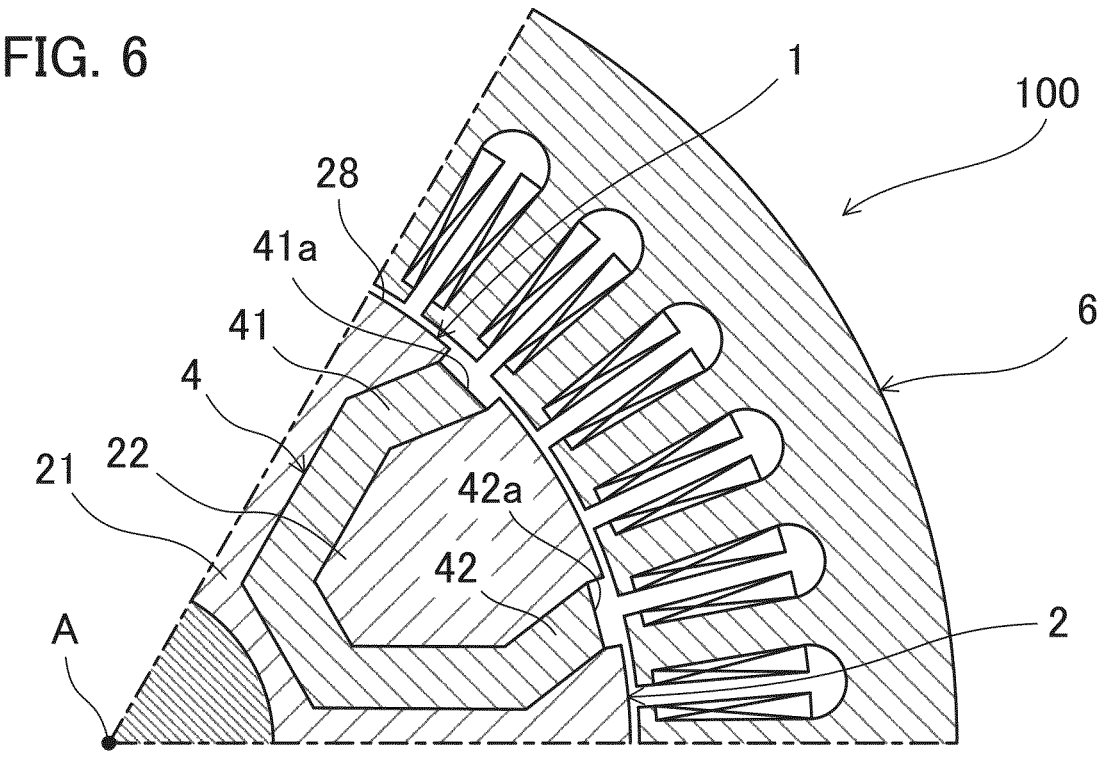
FIG. 6 is an enlarged sectional view of a motor of a modification.

FIG. 6 shows an enlarged sectional view of a motor of a modification. As shown in FIG. 6, at least one of the two end portions 41, 42 of the permanent magnet 4 may be positioned on the radial inside with respect to the outer peripheral surface 28 of the rotor body 2. In this example, both the two end portions 41, 42 of the permanent magnet 4 (specifically, both the end surfaces 41a, 42a) are positioned on the radial inside with respect to the outer peripheral surface 28 of the rotor body 2. In this case, a distance from the end portion 41, 42 of the permanent magnet 4 to the stator 6 can be increased. Thus, demagnetization of the permanent magnet 4 caused by a diamagnetic field due to the stator 6 can be reduced. Note that the rotor 1 shown in FIG. 3 is advantageous in decreasing air resistance at the time of rotation of the rotor 1 in a case where the end surfaces 41a, 42a of the two end portions 41, 42 of the permanent magnet 4 are flush with the outer peripheral surface 28 of the rotor body 2.

As described above, the rotor 1 includes the rotor body 2 rotatable about the rotation axis A and the permanent magnets 4 arranged in the circumferential direction centered on the rotation axis A in the rotor body 2 and having different magnetic poles alternately in the circumferential direction. The sectional shape of the permanent magnet 4 perpendicular to the rotation axis A is the shape extending along the predetermined reference line R, the permanent magnet 4 is magnetized in the direction crossing the reference line R in the section perpendicular to the rotation axis A, and at least one end portion 41 (or 42) of the permanent magnet 4 in the direction of the reference line R is exposed through the outer peripheral surface 28 of the rotor body 2.

The motor 100 includes the rotor 1 and the stator 6 that drives the rotor 1.

According to these configurations, the leakage flux which is the magnetic flux generated from the permanent magnet 4 and passing the radial outside of the end portions 41, 42 is reduced. Thus, the magnet torque generated by the magnetic flux from the permanent magnet 4 can be improved.

The permanent magnet 4 is curved or bent such that the two end portions 41, 42 of the permanent magnet 4 in the direction of the reference line R are closer to the outer peripheral surface 28 of the rotor body 2 than the middle portion 43 of the permanent magnet 4 in the direction of the reference line R is close to the outer peripheral surface 28, and both the two end portions 41, 42 are exposed through the outer peripheral surface 28 of the rotor body 2. Each of the two end portions 41, 42 of the permanent magnet 4 is exposed to the outside of the rotor body 2.

According to this configuration, the sectional shape of the permanent magnet 4 is curved or bent such that the two end portions 41, 42 of the permanent magnet 4 are closer to the outer peripheral surface 28 of the rotor body 2 than the middle portion 43 of the permanent magnet 4 is close to the outer peripheral surface 28, and therefore, both the two end portions 41, 42 of the permanent magnet 4 can be exposed through the outer peripheral surface 28 of the rotor body 2, and as a result, the leakage flux of the permanent magnet 4 can be further reduced.

The width W1 in the circumferential direction from one end portion 41 to the other end portion 42 of the two end portions 41, 42 of the permanent magnet 4 decreases toward the outer peripheral surface 28 of the rotor body 2.

According to this configuration, when receiving the centrifugal force at the time of rotation of the rotor 1, the permanent magnet 4 can be supported by the rotor body 2 from the radial outside, and accordingly, detachment of the permanent magnet 4 from the rotor body 2 can be reduced.

The width W2 of the portion 22c of the rotor body 2 sandwiched by the two end portions 41, 42 of the permanent magnet 4 decreases toward the outer peripheral surface 28 of the rotor body 2.

According to this configuration, when receiving the centrifugal force at the time of rotation of the rotor 1, the portion 22c can be supported by the two end portions 41, 42 of the permanent magnet 4 from the radial outside, and accordingly, detachment of the portion 22c from the permanent magnet 4 can be reduced.

According to this configuration, demagnetization of the permanent magnet 4 caused by the diamagnetic field due to the stator 6 can be reduced.

At least one of the two end portions 41, 42 of the permanent magnet 4 is positioned inside in the radial direction centered on the rotation axis A with respect to the outer peripheral surface 28 of the rotor body 2.

According to this configuration, the distance from the end portion 41, 42 of the permanent magnet 4 to the stator 6 can be increased. Thus, demagnetization of the permanent magnet 4 caused by the diamagnetic field due to the stator 6 can be reduced.

The permanent magnet 4 is the bonded magnet.

According to this configuration, the permanent magnet 4 can be easily in a desired shape.

<<Other Embodiments>>

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

Figure 7:
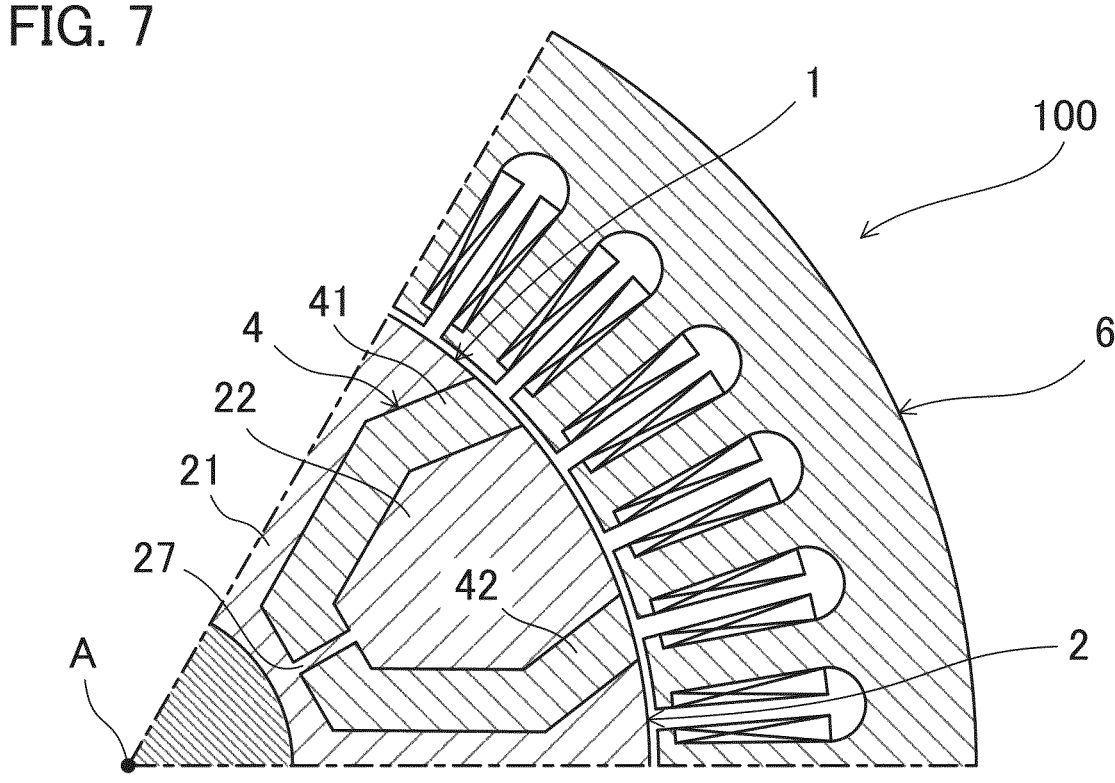
FIG. 7 is an enlarged sectional view of a motor of another modification.

The rotor body 2 does not necessarily include the shaft 5, and may include only the rotor core 20. The rotor body 2 does not necessarily include the rotor core 20, and may include only the shaft 5. The shaft 5 is not necessarily the soft magnetic material. The shaft 5 may be integrated with the rotor core 20. The first portion 21 and second portions 22 of the rotor body 2 are not limited to the separated portions, and as shown in FIG. 7, the permanent magnet 4 may have a coupling portion 27 coupling the first portion 21 and each second portion 22 to each other. In this case, the second portion 22 is coupled to the first portion 21 through the coupling portion 27, and therefore, the second portion 22 is not detached from the permanent magnet 4 at the time of rotation of the rotor 1. Moreover, the permanent magnet 4 is held by the first portion 21 and the second portion 22 coupled to each other, and therefore, the permanent magnet 4 is not detached from the first portion 21 either. Thus, in a case where the first portion 21 and each second portion 22 are coupled to each other through the coupling portion 27 as described above, the width W1 between the two end portions 41, 42 of the permanent magnet 4 does not necessarily decrease toward the outer peripheral surface of the rotor body 2, and the width W2 of the portion 22c of the rotor body 2 sandwiched by the two end portions 41, 42 of the permanent magnet 4 in the circumferential direction does not necessarily decrease toward the outer peripheral surface of the rotor body 2.

The number of permanent magnets 4 in the rotor 1 is not limited. The permanent magnet 4 may be an anisotropic bonded magnet or an isotropic bonded magnet. The permanent magnet 4 may be a sintered magnet obtained by sintering of magnetic powder. The sectional shape of the permanent magnet 4 is not limited. The sectional shape of the permanent magnet 4 may be, for example, a V-shape or a W-shape. The permanent magnet 4 may be configured such that only one of the two end portions 41, 42 is exposed through the outer peripheral surface 28 of the rotor body 2. For example, the permanent magnet 4 may be in a flat plate shape (i.e., the sectional shape thereof is a linear shape), and may be configured such that only one of both end portions of the sectional shape is exposed through the outer peripheral surface 28 of the rotor body 2.

The width W1 between the two end portions 41, 42 of the permanent magnet 4 does not necessarily decrease toward the outer peripheral surface of the rotor body 2. The width W2 of the portion 22c of the rotor body 2 sandwiched by the two end portions 41, 42 of the permanent magnet 4 in the circumferential direction does not necessarily decrease toward the outer peripheral surface of the rotor body 2.

DESCRIPTION OF REFERENCE CHARACTERS

100 Motor
1 Rotor
2 Rotor Body
22c Portion
28 Outer Peripheral Surface
4 Permanent Magnet.
41 End Portion
42 End Portion
43 Middle Portion
6 Stator
R Reference Line
A Rotation Axis
W1 Width
W2 Width

The invention claimed is:

1. A rotor, comprising:
a rotor body rotatable about a rotation axis; and
permanent magnets arranged in a circumferential direction centered on the rotation axis in the rotor body and having different magnetic poles alternately in the circumferential direction, wherein
a sectional shape of each permanent magnet perpendicular to the rotation axis is a shape extending along a reference line,
each permanent magnet has two end portions in a direction of the reference line and is magnetized in a direction crossing the reference line in a section perpendicular to the rotation axis,
at least one end portion of the two end portions of each permanent magnet is exposed through an outer peripheral surface of the rotor body, and
a distance from an outer side surface of one end portion to an outer side surface of another end portion of the two end portions of each permanent magnet decreases toward the outer peripheral surface of the rotor body.

2. The rotor of claim 1, wherein
each permanent magnet is curved or bent such that the two end portions of the each permanent magnet in the direction of the reference line are closer to the outer peripheral surface of the rotor body than a middle portion of the each permanent magnet in the direction of the reference line is to the outer peripheral surface, and
the two end portions are exposed through the outer peripheral surface of the rotor body.

3. The rotor of claim 2, wherein a width of a portion of the rotor body sandwiched by the two end portions of each permanent magnet decreases toward the outer peripheral surface of the rotor body.

4. The rotor of claim 1, wherein at least one of the two end portions of each permanent magnet is positioned inside in a radial direction centered on the rotation axis with respect to the outer peripheral surface of the rotor body.

5. The rotor of claim 1, wherein each permanent magnet is a bonded magnet.

6. A motor comprising:
the rotor of claim 1; and
a stator that drives the rotor.

* * * * *